Dec. 3, 1968   H. E. STUDER   3,413,789
VIBRATORY FRUIT HARVESTER
Filed Sept. 18, 1964   5 Sheets-Sheet 1
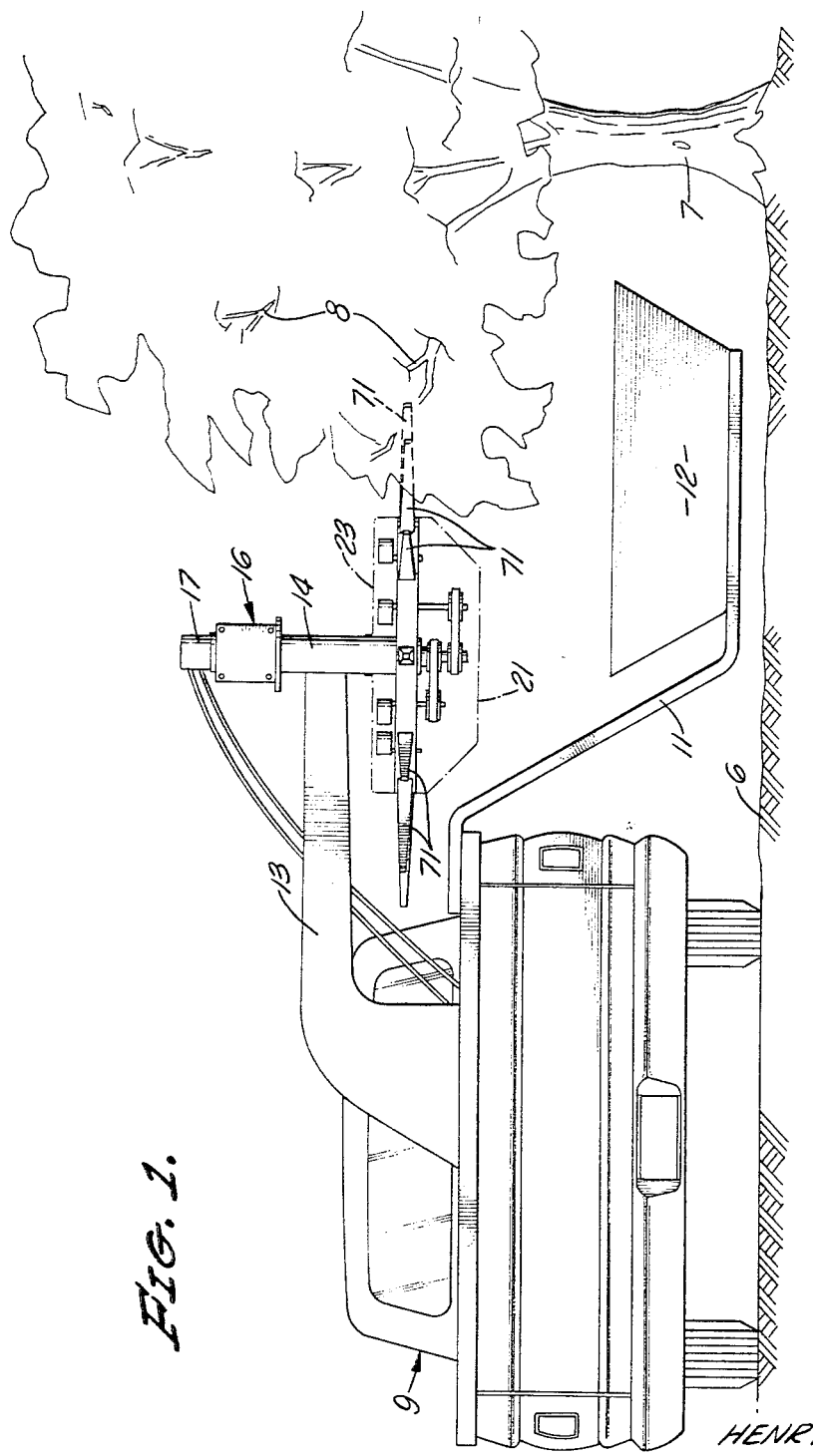
INVENTOR.
HENRY E. STUDER
BY Lothrop & West
ATTORNEYS

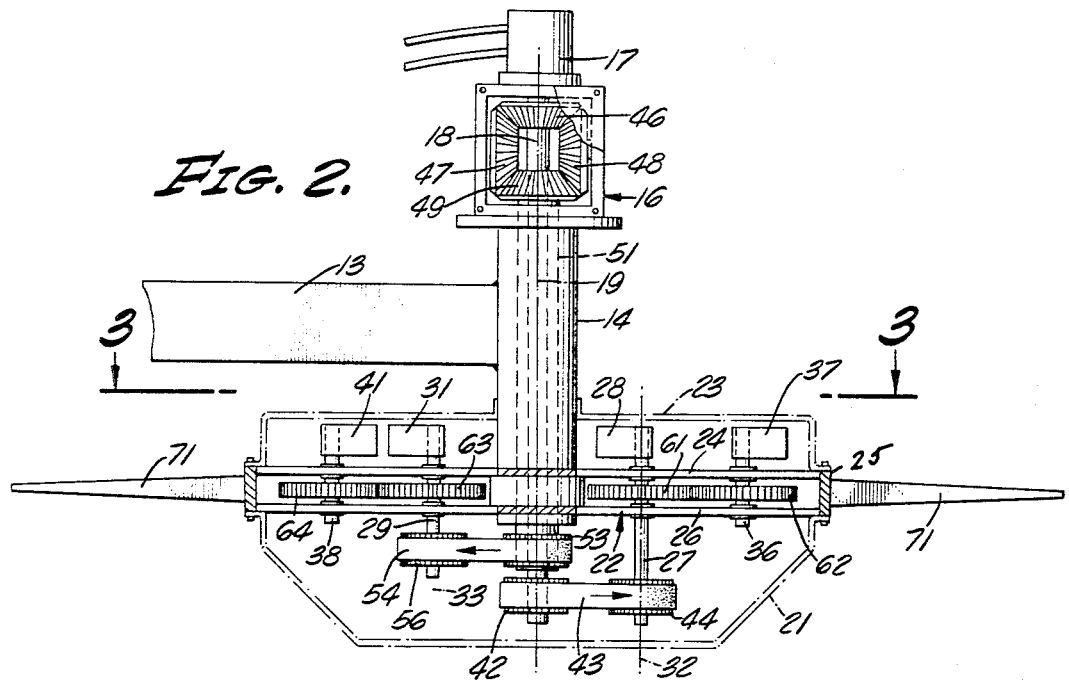
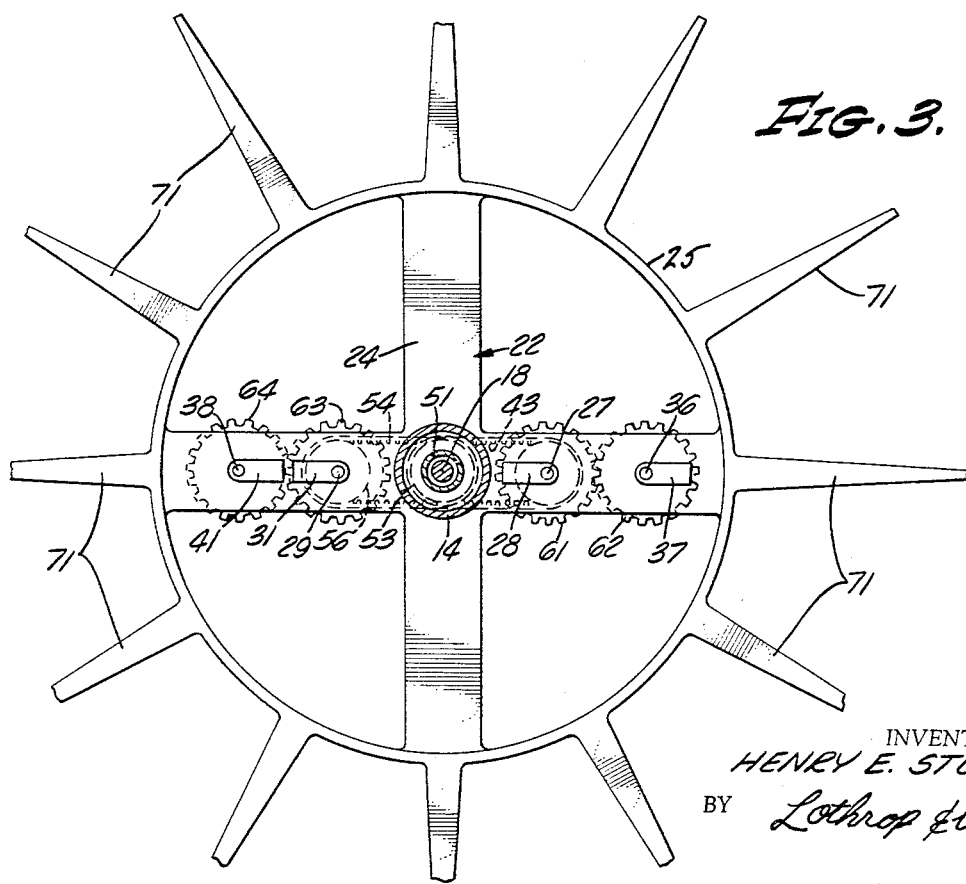

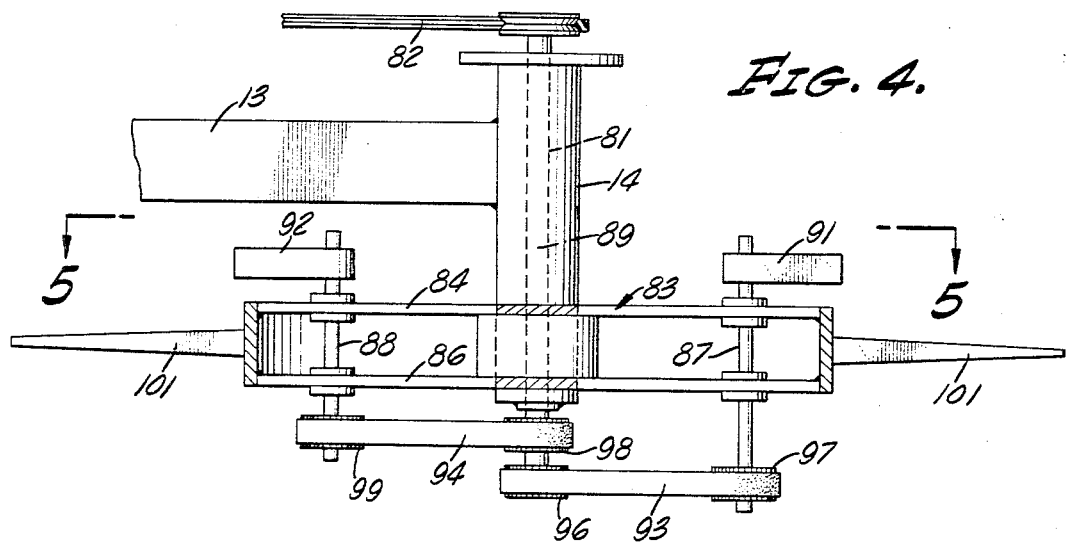
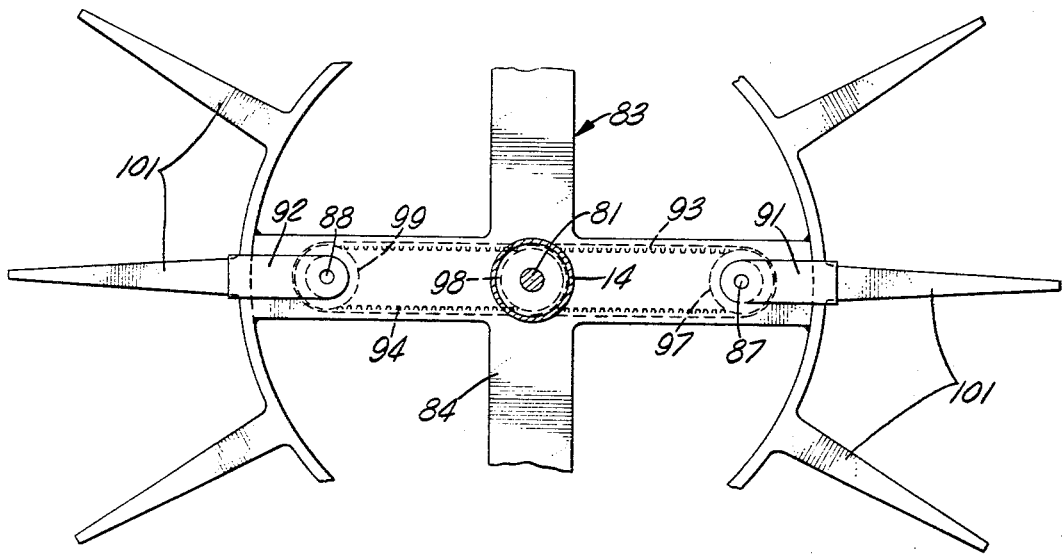

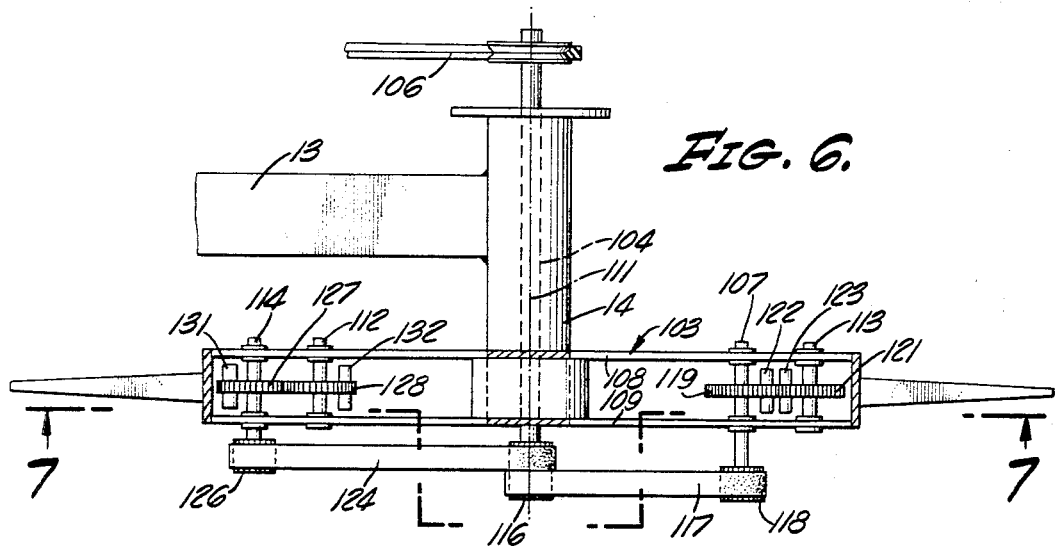
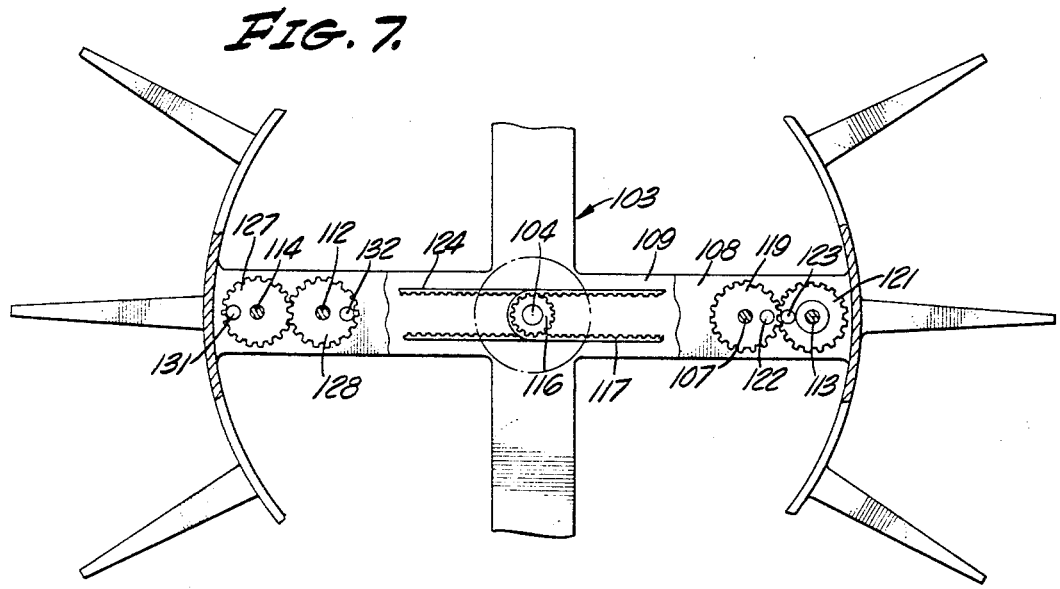

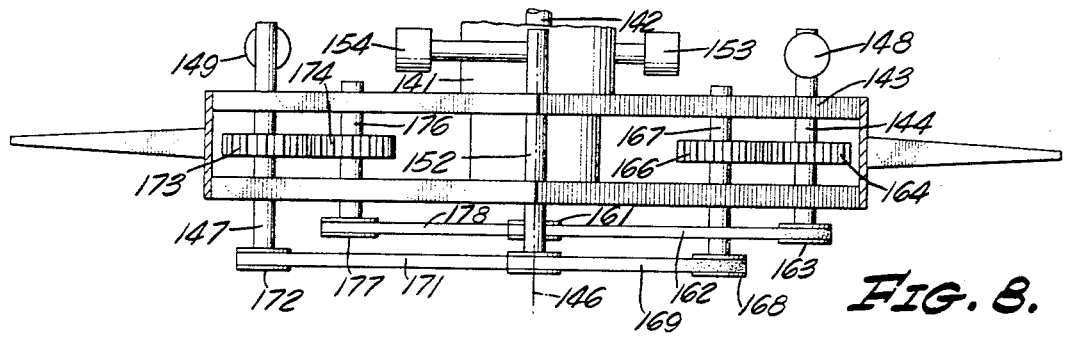
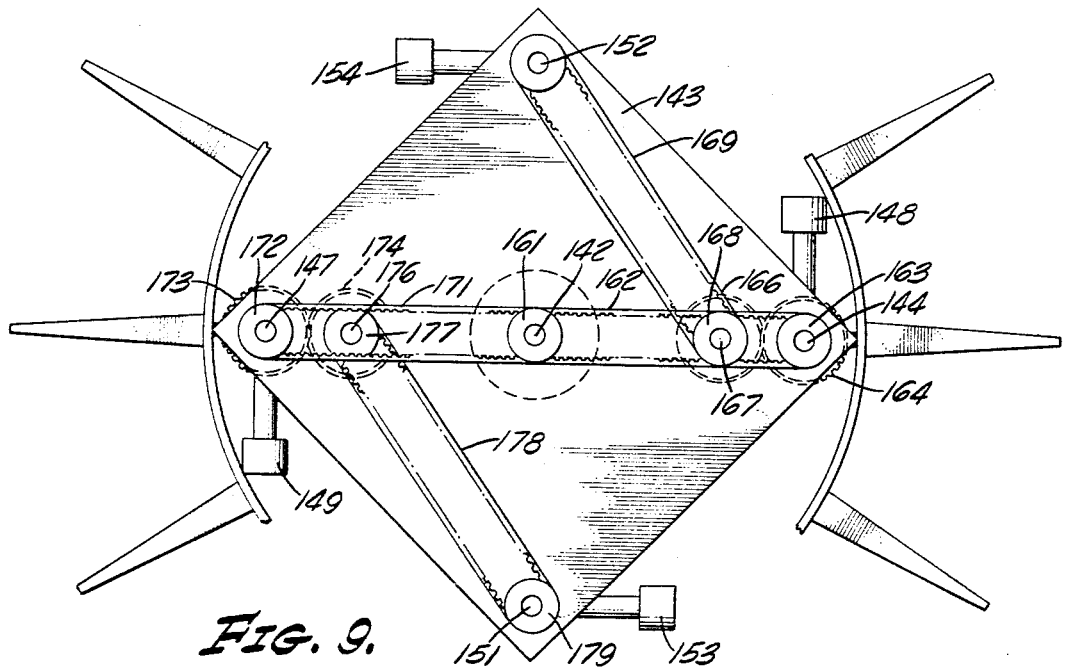
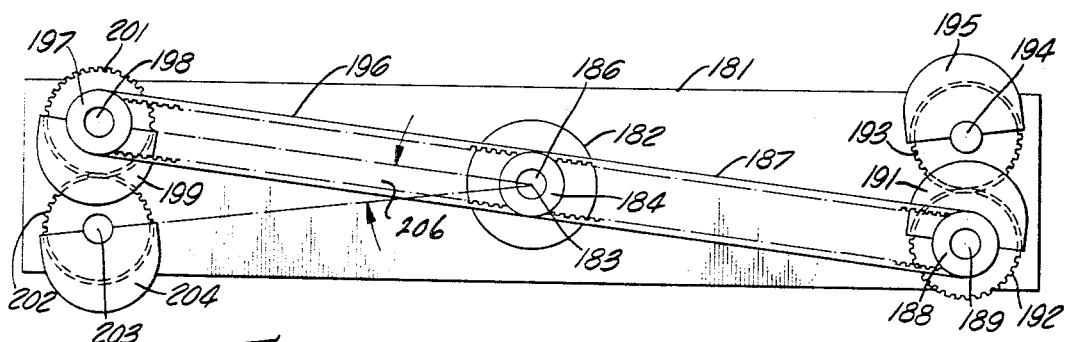

United States Patent Office 3,413,789
Patented Dec. 3, 1968

3,413,789
VIBRATORY FRUIT HARVESTER
Henry E. Studer, Davis, Calif., assignor to OECO Corporation, Portland, Oreg., a corporation of Oregon
Filed Sept. 18, 1964, Ser. No. 397,536
5 Claims. (Cl. 56—330)

My invention relates to devices primarily for use in agricultural environments for shaking trees, bushes and the like in order to dislodge the fruit (including nuts and berries) therefrom.

There are numerous mechanisms utilized for imparting a vibratory or shaking movement to a tree or bush usually in a generally horizontal plane. Some of these devices are temporarily attached to a tree or bush. There is reluctance to utilize machines of this sort under many circumstances because there may ultimately be damage to the growing plant. Other styles of vibrators have been utilized in which the vibrator is simply moved through the bush or the branches of the tree, but is unyielding with respect to the tree. These do not necessarily produce any large, permanent injury, but they often produce minor injuries in the path of the vibrator evidenced by breakage of branches or twigs.

It is therefore an object of my invention to provide a vibrator primarily for agricultural use to impart a satisfactory vibration to the tree or bush portion with which it is utilized, and which is freely or yieldably movable or rotatable as it moves past the same, so that injury to the plant being vibrated is obviated.

Another object of the invention is to provide a vibrator effective to induce a satisfactory vibrational component in the object to be vibrated, yet which does not shake itself to pieces.

Another object of the invention is to provide a vibrator in which the major vibrational components are produced in a fashion to be of maximum benefit on the plant or tree but which have little or no deleterious effect on the rest of the machine.

Another object of the invention is to provide a vibrator which is generally an improvement over other vibratory mechanisms presently available.

A still further object of the invention is to provide a vibrator which can quickly and easily be operated even by unskilled persons and which is simple to fabricate and easy to maintain.

Other objects together with the foregoing are attained in the embodiments of the invention described in the accompanying description and illustrated in the accompanying drawings, in which:

FIGURE 1 is an elevation of such a vibrator shown in a customary environment operating on a tree in an orchard;

FIGURE 2 is a view to an enlarged scale of a portion of the vibrator shown in FIGURE 1, certain parts being removed to disclose the interior construction;

FIGURE 3 is a cross section, the plane of which is indicated by the line 3—3 of FIGURE 2;

FIGURE 4 is a view comparable to FIGURE 2, but showing a modified form of vibrator pursuant to the invention;

FIGURE 5 is a cross section, the plane of which is indicated by the line 5—5 of FIGURE 4, certain parts being removed to reduce the extent of the figure;

FIGURE 6 is an elevation comparable to FIGURE 4 showing a further modified form of the vibrator, certain parts being removed to disclose the interior construction;

FIGURE 7 is a cross section, the plane of which is indicated by the line 7—7 of FIGURE 6;

FIGURE 8 is a side elevation comparable to FIGURE 6 and showing a different modified form of the invention;

FIGURE 9 is a plan of the structure shown in FIGURE 8; and

FIGURE 10 is a plan of a further modified form of the vibrator.

While the vibrator pursuant to the invention can be embodied in a number of different forms having the same general mode of operation, the device has successfully been incorporated for actual use particularly in the forms shown herein. In the form disclosed in FIGURES 1, 2 and 3, the device is designed for utilization in an area 6 in which a tree 7 grows. Usually the tree is part of an orchard wherein a number of trees grow in rows. On the tree branches 8, nuts or fruits (almonds, for example) are available for dislodgment by vibration. In order to shake the branches and foliage of the tree so that the fruits or nuts are detached, there is provided a retrieving truck 9 operable in the area 6. The truck has an extension 11 on which a bin 12 is mounted for movement beneath the tree branches and to receive the falling fruit.

Also extending from the truck 9 is an overhanging arm 13 constituting a main frame connected to a vertically extending sleeve 14 designed so that the sleeve is substantially above the bin 12. At its upper end the sleeve merges with a gear box 16 at the top of which is mounted a driving motor 17. The motor is pneumatic, electric or hydraulic. The motor 17 is supplied with energy from a source (not shown) on the truck 9 and is effective to rotate a drive shaft 18. This shaft is carried on suitable bearings and extends from the motor 17 along a vertical axis 19 to emerge inside of a housing 21 closing the lower portion of a vibrator frame 22. A similar housing 23 closes the upper portion of the vibrator frame.

The vibrator frame 22 is journalled on the lower end of the sleeve 14 and is freely rotatable about the axis 19. The frame 22 includes an upper plate 24 joined by a circumferential band 25 to a lower plate 26. Mounted on the vibrator frame 22 at a predetermined radius from the axis 19 is a vertical shaft 27. The shaft is journalled in the plates 24 and 26 and at its upper end carries an eccentric weight 28. Similarly journalled in the plates 24 and 26 is a vertical shaft 29 carrying another eccentric weight 31 above the plate 24. The weights 28 and 31 form a pair of weights, each of which rotates about its own individual one of a pair of axes 32 and 33. These axes 32 and 33 are both in the same vertical plane containing the axis 19 and are diametrically opposite each other at the same radius from the axis 19.

It is preferred to employ two pairs of weights, although one pair, suitably arranged, will serve. Thus, in a similar fashion, a shaft 36 is journalled in the vibrator frame between the plates 24 and 26 at another predetermined radius from the axis 19 and in the same plane as the shaft 27. This shaft 36 carries an eccentric weight 37 above the plate 24. On the opposite side of the vibrator frame and having its axis in the same plane as the axis 19 and the axis 33 is a shaft 38 journalled in the plates 24 and 26 and at its upper end carrying an eccentric weight 41. The weights 37 and 44 constitute the second pair. There is a relationiship between the several weights, including their phase, the direction of their rotation, etc., that will be explained below.

To rotate the various shafts, the drive shaft 18 at its lower end has a toothed wheel 42 fixed thereon and joined by a timing belt 43 to a toothed wheel 44 fast on the shaft 27. Thus, when the motor 17 is energized, the eccentric weight 28 is rotated in synchronism therewith.

Since it is desired to operate the weight 31 at the same speed as the weight 28 but in an opposite direction to the direction of rotation of the weight 28, the drive shaft 18 near its upper end carries a bevel gear 46 in mesh with side bevel gears 47 and 48 mounted in the gear box 16. These side gears mesh with a bevel gear 49 at the upper end of a drive tube 51 journalled within the sleeve 14 and surrounding the shaft 18. At its lower end the tube 51 carries a toothed wheel 53 joined by a timing belt 54 to a toothed wheel 56 on the shaft 29. The eccentric weight 31 is thus made to revolve in unison with motor 17 but in an opposite sense or direction of rotation from that of the weight 28. The timing belts are applied to the various toothed wheels so that the weights 28 and 31 are connected exactly in phase with each other.

To drive the weight 37, the shaft 27 carries a gear 61 meshing with an equal gear 62 on the shaft 36. These gears mesh in such a fashion that the weights 28 and 37 revolve in opposite directions to each other and are connected one hundred eighty degrees out of phase. Similarly, the shaft 29 carries a gear 63 meshing with an equal gear 64 on the shaft 38, so that the weights 31 and 41 rotate in opposite directions and are connected one hundred eightly degrees out of phase with each other. Thus the pairs of weights 28 and 31 are in phase with each other and rotate in opposite directions, while the weights 37 and 41 are in phase with each other and rotate in opposite directions. The forces resulting when this eccentric weight structure is operated when the motor is energized vibrate the vibrating frame in a substantial amount in alternating circumferential directions but without any prevailing unidirectional rotational force being exerted on the vibrator frame. Thus, although the frame oscillates to and fro in a horizontal plane with small amplitudes, it can nevertheless be freely rotated or can yield circumferentially about the axis 19 and with respect to the main frame 13 without interfering with the vibrational motions. The vibrating frame can thus travel or "roll" freely through the branches of a tree or bush without causing any injury and while effectively imparting vibration thereto.

In order that there may be extended engagement with the tree branches 8 or bush branches, the vibrator frame 22 is augmented by a number of radial arms 71 or spokes of a contour and length to extend as far as desired into the particular material being worked with. The device is set into operation and the truck 9 is driven slowly along the row of trees or bushes. The vibrating fingers or arms 71 come into contact with the adjacent parts of the tree or bush and vibrate them sufficiently to dislodge the desired fruit. This falls into the receiving container 12 for further handling. The arms 71 are not mechanically rotated by the motor 17 in any appreciable amount and enter into and in effect roll through the tree branches something like a gear wheel as the truck 9 advances. If any obstruction is met, the wheel revolves to yield to the obstruction. The momentary interengagement between the arms and the bush or tree is not at all harmful or damaging.

The device for convenience is referred to as a horizontal vibrator and is normally mounted with its main axis vertical as shown in FIGURE 1, but under some circumstances the main frame 13 is made so that the sleeve 14 can be inclined for operation at an angle. The sleeve is also made so that the arms 71 can be located for operation at any desired height.

In some instances, a modified form of vibrating structure is utilized while the supporting structure remains the same. As particularly shown in FIGURES 4 and 5, the sleeve 14 carries but a single drive shaft 81 driven from a suitable source of power (like the motor 17) by a belt 82. A vibrator frame 83 is freely rotatable on the sleeve 14 and includes a pair of plates 84 and 86 in which shafts 87 and 88 are journalled, both having their respective axes at the same radius from the central axis 89 and both located in the same plane which contains the axis 89. Each shaft carries one of a pair of eccentric weights 91 and 92 at its upper end and is driven by a respective one of two timing belts 93 and 94.

The belt 93 engages a toothed wheel 96 on the drive shaft, as well as a toothed wheel 97 on the driven shaft 87. The belt 94 engages a toothed wheel 98 on the drive shaft and a toothed wheel 99 on the driven shaft 88. The arrangement is such that the weights 91 and 92 rotate in the same direction but are one hundred eighty degrees out of phase with each other. In this instance also the vibrator frame has radial arms 101 or spokes for interengaging with a tree or a bush. The operation of this structure, involving only two weights, is substantially the same as that of the structure shown in FIGURE 2, although there is some residual driving force tending to cause the vibrator frame 83 to rotate slowly about the axis 89. The force involved in such rotation, however, is relatively slight and there is no substantial mechanical obstruction or opposition to the rotation of the vibrator frame either forwardly or backwardly around the axis 89 upon contact with tree limbs and the like.

In FIGURES 6 and 7 there is a further modification, involving four weights. In this the sleeve 14 carries a vibrator frame 103 journalled thereon and contains a drive shaft 104 driven through a belt 106 from any suitable rotary source. The vibrator frame on one side has a shaft 107 journalled in plates 108 and 109 and disposed parallel to a central axis 111 and at a predetermined radius therefrom. A similar shaft 112 is journalled in the plates 108 and 109 and is at the same radius and occupies the same plane as the shaft 107. Similarly, a coplanar shaft 113 is correspondingly journalled in the plates 108 and 109 at a different radius from the axis 111 and at that same increased radius a coplanar shaft 114 is journalled between the plates 108 and 109.

To drive the various shafts, the central shaft 104 carries a toothed wheel 116 at its lower end. A timing belt 117 meshes with the toothed wheel 116 and engages a toothed wheel 118 on the nearer shaft 107. A gear wheel 119 on the shaft 107 meshes with a gear wheel 121 on the farther shaft 113. An eccentric weight 122 on the gear wheel 119 and an eccentric weight 123 on the gear wheel 121 are so arranged that they rotate in opposite direction with respect to each other and are one hundred eighty degrees out of phase. Comparably, on the other side of the machine's main axis 111 a timing belt 124 meshes with the toothed wheel 116 and with a toothed wheel 126 on the lower end of the farther shaft 114. A gear wheel 127 meshes with a gear wheel 128 on the nearer shaft 112. An eccentric weight 131 is provided on the gear wheel 127 and a similar eccentric weight 132 is provided on the gear wheel 128. The weights 131 and 132 operate in opposite directions and one hundred eighty degrees out of phase with each other. The arrangement is such that the nearer shaft 107 and the opposite farther shaft 114 turn in the same direction and the shafts 112 and 113 turn in the opposite direction. The position of the weights is such that the two weights 122 and 132 operate in phase with each other, although in opposite directions, and the weights 123 and 131 operate in phase with each other but in opposite directions, likewise at one hundred eighty degrees out of phase with the first weights. The function of this structure and its operation is substantially the same as previously described.

As a further variation, the structure shown in FIGURE 8 can be employed. In this instance, the sleeve 141 carries a drive shaft 142 which emerges below a vibrator frame 143 freely journalled on the sleeve 141. The vibrator frame carries a shaft 144 at a particular radius from the central axis 146 and similarly carries another shaft 147 at the same radius from the axis 146 and in the same plane as the axis 146. The two shafts 144 and 147 carry weights 148 and 149 respectively. At the same radius from the axis 146 and contained in a plane containing that axis and spaced ninety degrees about the axis of shaft 142 from the plane of the shafts 144 and 147 are shafts 151 and 152 each carrying its own respective weight 153 and 154.

In order to drive these various shafts, the drive shaft 142 at its lower end carries a toothed wheel 161 from which a timing belt 162 extends to a toothed wheel 163 on the lower end of the shaft 144. The shaft 144 also carries a gear 164 meshing with a gear 166 on an auxiliary shaft 167. A timing wheel 168 at the bottom of the shaft 167 carries a timing belt 169 meshing with a timing wheel at the bottom of the shaft 152. In a similar fashion, the timing wheel 161 carries a belt 171 meshing with a toothed wheel 172 at the bottom of the shaft 147. A gear 173 on the shaft 147 meshes with a gear 174 on an auxiliary shaft 176. A toothed wheel 177 on the bottom of the shaft 176 carries a timing belt 178 which meshes with a similar timing wheel 179 on the shaft 151. With this arrangement, the shafts 144 and 147 rotate in unison and in the same direction but with their own weights one hundred eighty degrees out of phase. The shafts 151 and 152 rotate in the same direction with respect to each other but in a direction opposite to that of the weights 148 and 149 and furthermore while out of phase one hundred eighty degrees with respect to each other are additionally out of phase ninety degrees with respect to the weights 148 and 149. The net result of this structure is substantially the same as previously described.

As shown in FIGURE 10, there is a further variation. In this instance, the vibrating frame 181 is freely rotatable with respect to the main frame 182 about a vertical axis 183. A timing wheel 184 on the driving shaft 186 drives a timing belt 187 engaging a timing wheel 188 on a shaft 189 located on the frame 181 with its axis parallel to the axis 183. An eccentric weight 191 is mounted on the shaft 189. Also mounted on the shaft 189 is a gear wheel 192 meshing with a gear wheel 193 on a shaft 194 parallel to the shaft 189. A weight 195 is eccentrically mounted on the shaft 194. Similarly, on the other side of the structure, a timing belt 196 meshing with the driving wheel 184 meshes further with a timing wheel 197 on a shaft 198 immediately opposite the shaft 189. An eccentric weight 199 is on the shaft 198, as is a driving gear 201. Meshing with the driving gear is a driven gear 202 on a shaft 203 exactly opposite the shaft 194 and at the same radius from the central axis 183. An eccentric weight 204 is fast on the shaft 203. The weights 204 and 195 are exactly one hundred eighty degrees out of phase with each other, whereas the weights 191 and 199 are also one hundred eighty degrees out of phase with each other. The phase difference between the weights 195 and 191 on one side and 199 and 204 on the other side are the same as the angle 206 between the individual plane in which the shafts 189 and 198 are disposed and the plane in which the shafts 194 and 203 are disposed. The operation of this structure is substantially the same as that of those previously described.

The main objective of the invention is to develop a circumferential vibration in the rotor that has no appreciable directional component, such as would tend to shake the truck or rotor support to pieces by producing crystallization of metal parts therein, and such that the rotor is free to rotate or to be rotated unidirectionally, as by force applied to its fingers engaging the branches while the mechanism is moving on its carriage past the tree. Whatever transaxial force component or components may be produced in the rotor structure by one or more rotating weight masses the same are countered and preferably wholly neutralized by an opposed component or components developed by one or more other weight masses, yet the reaction forces of the rotating masses combine to apply vibrational torque on the rotor as desired. It will be evident that a number of different arrangements of rotating masses may be employed which will fulfill this objective and that the arrangements shown herein are merely preferred examples.

What is claimed is:
1. A fruit harvester adapted for dislodging fruit from plants by vibration thereof, comprising a carriage adapted for movement along a planting, a plant-engaging rotor having a plurality of fingerlike projections thereon distributed about the circumference of said rotor to penetrate the plant growth with the rotor positioned against the planting, a rotor support on said carriage defining an axis of rotation for said rotor transverse to the direction of carriage movement permitting substantially continuous rolling contact of said rotor with the planting at a speed corresponding approximately to the speed of such carriage movement, a plurality of rotative weight masses, means mounting said masses on the rotor for rotation thereon about respective axes substantially parallel to and offset from said rotor axis, drive means drivingly connected to said masses to rotate the same synchronously at relatively high speed about their respective axes, the angular positional relationship of said masses while in rotation and the locational relationships of their respective axes being such that their rotational torque reaction forces combine additively to vibrate the rotor in a rotative sense while combining subtractively in a lineal sense so as to offset each other and thereby reduce vibrational loading forces on the rotor support.

2. The fruit harvester defined in claim 1, having at least two of said weight masses mounted on the rotor at diametrically opposite positions.

3. The fruit harvester defined in claim 1, having at least two of said weight masses mounted in the rotor in substantially the same plane containing the rotor's axis and on the same side of that axis.

4. The fruit harvester defined in claim 1, having more than two of said weight masses distributed about the rotor axis with angular separation less than 180 degrees between successive ones of said masses.

5. In a machine for harvesting fruit from bushes growing in row formation as the machine travels along a row, comprising in combination,
bush-penetrating means,
means mounting said penetrating means for idling orbital rotation in a horizontal plane,
said idling rotation imparted to said bush-penetrating means by their penetration into the bushes as the machine travels along a row,
eccentric rotary means associated with said bush-penetrating means,
a power source carried by the machine,
a driving connection between said power source and said eccentric means for imparting reciprocatory motion in a horizontal plane to said means mounting the bush-penerating means and hence to the bushes in the direction of the length of the row independent of the rotation imparted to the penetrating means by the travel of the machine.

References Cited
UNITED STATES PATENTS

| 2,293,962 | 8/1942 | Baily | 74—61 X |
| 2,607,569 | 8/1952 | Pierre. | |
| 2,936,064 | 5/1960 | Schuessler | 74—61 X |

FOREIGN PATENTS

| 535,851 | 4/1941 | Great Britain. |
| 309,179 | 6/1933 | Italy. |

RUSSELL R. KINSEY, *Primary Examiner.*